United States Patent

[11] 3,623,668

| [72] | Inventors | Wilbert B. Freid<br>Swampscott;<br>David J. Tapparo, Danvers, both of Mass. |
|---|---|---|
| [21] | Appl. No. | 12,903 |
| [22] | Filed | Feb. 19, 1970 |
| [45] | Patented | Nov. 30, 1971 |
| [73] | Assignee | General Electric Company<br>Continuation of application Ser. No.<br>710,171, Mar. 4, 1968, now abandoned.<br>This application Feb. 19, 1970, Ser. No.<br>12,903 |

[54] WASH MANIFOLD
8 Claims, 5 Drawing Figs.

[52] U.S. Cl................................................239/265.17,
60/39.53, 137/15.1, 239/550
[51] Int. Cl............................................... B64c 15/10
[50] Field of Search..........................................239/265.17,
549, 550, 557; 60/39.53; 137/15.1

[56] References Cited
UNITED STATES PATENTS

| 1,493,753 | 5/1924 | Koleroff | 239/265.17 |
| 2,549,819 | 4/1951 | Kane | 60/39.53 UX |
| 2,686,631 | 8/1954 | Jordan | 60/39.53 UX |
| 2,874,537 | 2/1959 | Scarborough | 60/39.53 X |
| 2,906,089 | 9/1959 | Kadosch et al. | 137/15.1 |
| 2,974,482 | 3/1961 | Kelley | 60/39.53 X |
| 3,525,474 | 8/1970 | Von Chain et al. | 239/265.17 |

*Primary Examiner*—M. Henson Wood, Jr.
*Assistant Examiner*—Michael Y. Mar
*Attorneys*—Derek P. Lawrence, Frank L. Neuhauser, Oscar B. Waddell, Edward S. Roman and Joseph B. Forman

ABSTRACT: A manifold spray assembly having an annular housing adapted to be removably secured to the inlet end of a gas turbine and support a plurality of nozzle assemblies adapted to spray a fluid into the intake airstream of a gas turbine compressor for cleaning, preservation, or thrust augmentation purposes. The nozzles are recessed within the annular housing so as not to interfere with the gas turbine intake airflow and are connected to a fluid inlet fitting through connector blocks and conduits.

PATENTED NOV 30 1971 3,623,668
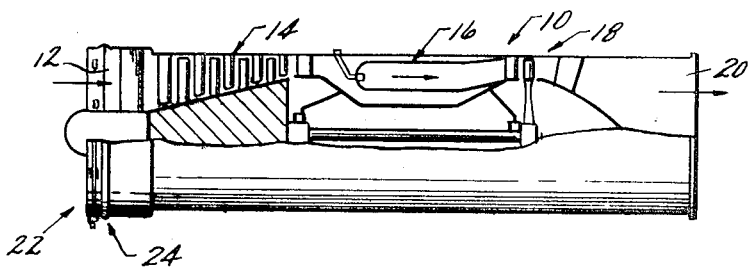
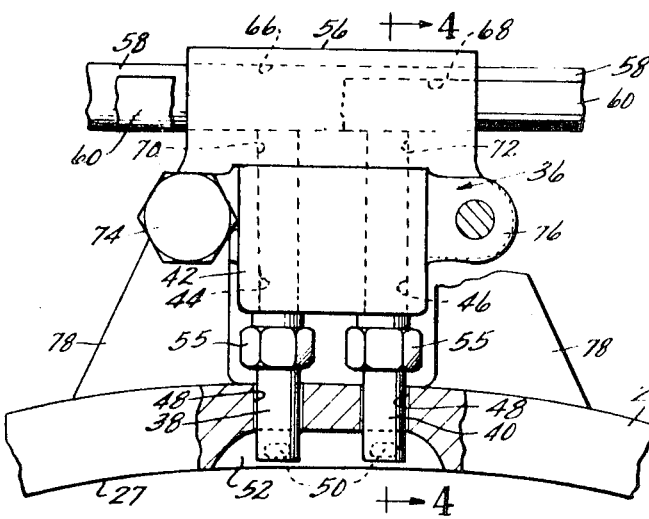
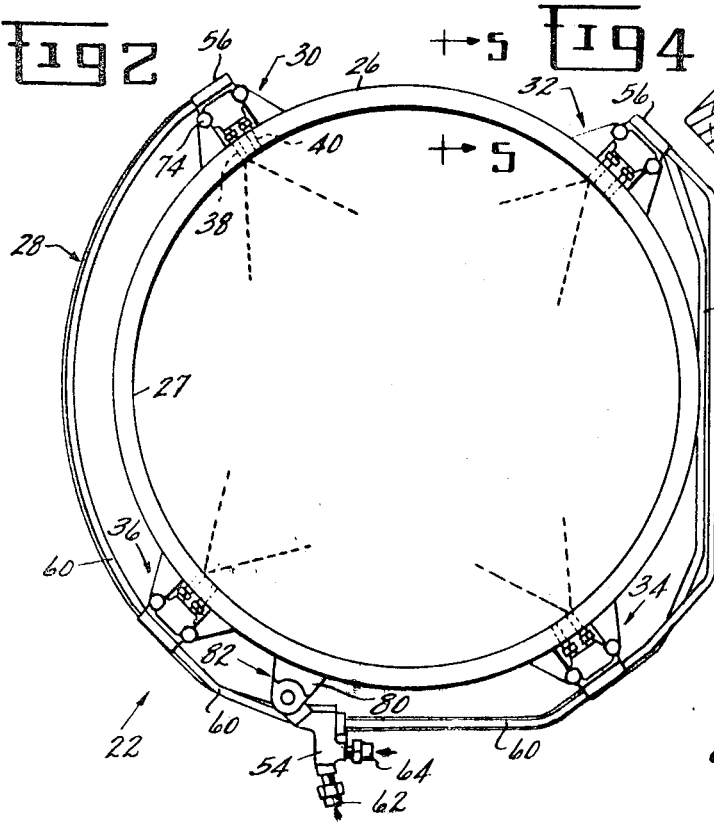
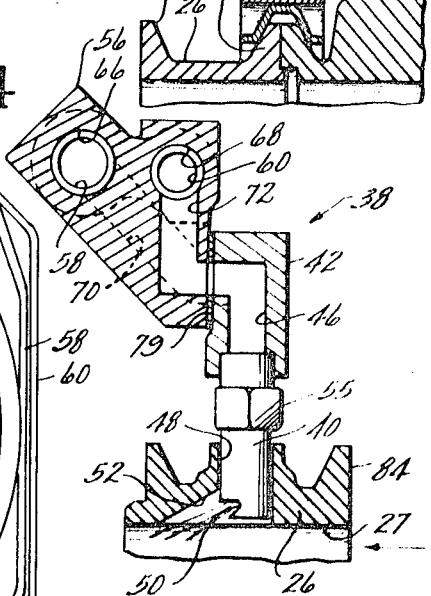
INVENTORS.
WILBERT B. FREID
DAVID J. TAPPARO
Erwin F. Berrin Jr.
ATTORNEY

WASH MANIFOLD

This application is a continuation of application No. 710,171, filed Mar. 4, 1968, now abandoned.

This invention relates to gas turbines and, more particularly to a manifold spray assembly adapted to spray or direct a fluid into a gas turbine for cleaning, preservative or thrust augmentation purposes.

One object of this invention is to provide a device for uniformly spraying or directing a fluid into a gas turbine which does not interfere with the airflow into or through the gas turbine.

Another object is to provide a device as above described which may be readily removably attached to a gas turbine.

Another object is to provide a device as above described which is of minimum weight and size.

Another object is to provide a device for washing, applying a preservative to, and augmenting thrust or horsepower output of a gas turbine.

Yet another object is to provide an apparatus which is readily attachable to the forward or intake end of a gas turbine engine and is adapted to spray or direct a suitable fluid generally uniformly throughout the compressor air intake without interfering with the airflow into the compressor.

A further object is an apparatus as above described wherein the spray nozzles may be readily removed for cleaning or replacement.

Other objects and advantages of the invention will become apparent upon reading the following description of the preferred embodiment.

BRIEF DESCRIPTION OF THE DRAWINGS

The invention is illustrated more or less diagrammatically in the accompanying drawings, wherein:

FIG. 1 is a side elevational view in partial section showing one embodiment of the manifold spray assembly of this invention secured to a gas turbine;

FIG. 2 is an enlarged front elevational view of the manifold spray assembly of FIG. 1;

FIG. 3 is an enlarged view in partial section showing a portion of the spray means of this invention;

FIG. 4 is a cross-sectional view taken along line 4—4 of FIG. 3; and

FIG. 5 is a cross-sectional view taken along 5—5 of FIG. 2 and drawn to an enlarged scale.

DESCRIPTION OF THE PREFERRED EMBODIMENT

Referring now to the drawings and particularly to FIG. 1, a gas turbine has been shown generally at 10 having an air intake 12, a suitable compressor 14, a combustion chamber 16 where fuel is introduced and burned, a turbine 18 adapted to be driven by the hot gas stream formed in the combustion chamber 16 and a suitable discharge nozzle 20.

The manifold spray assembly of this invention has been shown generally at 22 secured to the forward or intake end of the gas turbine 10 by means 24 which enable the spray assembly to be readily removed and replaced.

Referring now to FIG. 2 the manifold spray assembly 22 has been shown as comprising an annular housing or support ring 26 formed with an axial bore 27, means for spraying or directing a liquid or suitable fluid generally radially inwardly and axially rearwardly of the support ring axial bore 27, and means 28 for delivery of a liquid or suitable fluid to the spray means.

The means for spraying or directing a liquid or fluid includes four nozzle assemblies 30, 32, 24, and 36 respectively comprising a first nozzle 38 and a second nozzle 40 suitably secured to a nozzle support block 42 in a position communicating respectively with passages 44 and 46 formed in each nozzle support block.

The nozzles 38 and 40 extend generally radially into apertures 48 formed in the support ring 26 but do no extend beyond the support ring axial bore 27 and hence do not interfere with the gas turbine inlet airstream.

Each nozzle 38, 40 is formed with an aperture or orifice 50 adapted to spray a liquid or direct a fluid generally radially into and axially rearwardly along the support ring axial bore 27 or toward the gas turbine compressor 14. A suitable groove or recess 52 is formed in the support ring 26 adjacent each aperture 48 so that the liquid spray or fluid may be directed axially rearwardly of the support ring axial bore 27 or toward the gas turbine compressor 14 without interference from the support ring 26.

Each nozzle 38, 40 may be provided with an enlarged portion 55 which is sized larger than the aperture 48 so as to preclude the nozzles from falling into the axial bore 27 and hence into the gas turbine inlet 12.

The liquid or fluid delivery means 28 has been shown as including an inlet fitting 54, a plurality of connecting blocks 56, and a plurality of conduits 58 and 60 for directing fluid from the inlet fitting 54 to the connector blocks 56. The inlet fitting 54 is formed with a first inlet 62 and a second inlet 64 adapted respectively to be connected to a source of fluid (not shown) suitable for washing, preservation or power augmentation purposes.

Each connector block 56 is formed with a first and second central passage 66 and 68 respectively, a passage 70 adapted to communicate passage 66 with the nozzle support block passage 44, and a passage 72 adapted to communicate passage 68 with nozzle support block passage 46.

As best shown in FIG. 2, the conduits 58 extend around the support ring 26 and interconnect all connector block passages 66 with the inlet 62. The conduits 60 are arranged in like manner in axial spaced relationship to conduits 58 and interconnect all connector block passages 68 with the inlet 64.

Each nozzle assembly 30, 32, 34 and 36 is secured to its respective connector block 56 and the support ring 26 with passage 44 communicating with connector block passage 70 and passage 46 communicating with connector block passage 72 by suitable fasteners 74. The fasteners 74 extend through oppositely extending lugs or ears 76 formed on each nozzle support block 42, through generally radially outwardly projecting ears 78 formed on the support ring 26, and into a suitable threaded portion (not shown) formed in each connector block 56.

A suitable gasket 79 may be interposed between each nozzle support block 42 and connector block 56 as shown in FIG. 4 to prevent fluid leakage.

A lug or ear 80 may be provided on the support ring 26 to which the inlet fitting 54 may be secured as at 82. As shown in FIG. 2, the inlet fitting 54 is preferably mounted to the support ring 26 with inlets 62 and 64 located radially outwardly of the conduits 58, 60 so that when the manifold spray assembly 22 is mounted to the gas turbine 10 with the fitting 54 down or at the bottom, the manifold spray assembly will be self draining.

The support ring 26 may be provided with a radially outwardly extending peripheral flange 84 at one or both ends which is adapted for use with a circumferential V-band clamp 86 of the type well known to those skilled in the art for removably securing the manifold spray assembly 22 to the gas turbine 10 and for mounting accessories such as an oil tank, Bellmouth or the like to the manifold spray assembly.

Although the spray means have been shown as comprising four generally equally circumferentially spaced nozzle assemblies 30, 32, 34 and 36 each having two nozzles 38, 40 extending therefrom, it should be understood that more or less than four nozzle assemblies may be used and that each nozzle assembly may have more or less than two nozzles.

The use operation and function of the invention are as follows:

The manifold spray assembly 22 is removably secured to the intake or forward end 12 of a gas turbine 10 using a circumferential V-band clamp 86. Preferably, the assembly is mounted with the inlet fitting 54 down so that the assembly will be self draining. Inlet 62 is connected to a source of washing and thrust augmentation fluid while inlet 64 is connected to a source of preservative fluid. When it is desired to wash the gas turbine 10 or augment thrust, fluid is directed from inlet 62 through conduits 58, through connector block passages 66 and 70, through nozzle support block passage 44 to nozzle 38. The nozzle orifice 50 then directs the fluid radially inwardly of the axial bore 27 and axially into the compressor 14. The four nozzles 38 are spaced generally equally around the manifold spray assembly 22 so as to provide a uniform spray of fluid throughout the gas turbine air intake 12.

When it is desired to apply preservative, preservative fluid is directed into inlet 64, through conduits 60, connector block passages 68 and 72, and nozzle support block passages 46 to the four generally equally circumferentially spaced nozzles 40 and hence radially inwardly of the axial bore 27 and axially into the compressor 14.

It should be noted that the nozzles 38 and 40 are recessed within the support ring 26 so as not to extend or project into and interfere with the gas turbine compressor intake airstream.

Although a preferred embodiment of the invention has been depicted and described, it should be understood that many addition, alteration, and variations may be made without departing from the invention's fundamental theme.

What is claimed is:

1. In a gas turbine engine, a spray apparatus comprising, in combination, housing means having an axial bore being located on a gas turbine for passage of the gas turbine intake air stream through said axial bore, and spray means carried by said housing means in noninterfering relationship to said intake air stream for spraying fluid into said air intake airstream, said spraying means comprising a plurality of nozzles recessed within said housing means so as not to protrude into said axial bore, each said nozzle having an orifice adapted to spray fluid generally radially inwardly of and axially along said housing means axial bore with the interior surface of said housing means having a groove adjacent each said nozzle adapted to allow passage of said axially directed spray of fluid.

2. The spray apparatus recited in claim 1 wherein said housing means includes a plurality of apertures extending generally radially from said axial bore, each said nozzle located in one of said apertures with an inner terminal position whose radius from said axial bore is at least equal to the bore radius.

3. The spray apparatus recited in claim 2 wherein each said nozzle includes an enlarged portion outwardly of said housing means sized to prohibit passage of said nozzle through its respective aperture and into said axial bore.

4. The spray apparatus recited in claim 1 wherein the means for spraying fluid into said intake airstream comprises a plurality of nozzle assemblies, each said nozzle assembly having a first nozzle and a second nozzle secured to a nozzle support block and recessed within said housing means, each said nozzle having an orifice adapted to spray fluid generally radially inwardly and axially along said housing means axial bore.

5. The spray apparatus recited in claim 4 which further includes means for delivering fluid to each said nozzle, said means comprising an inlet fitting having a first inlet and a second inlet, first conduit means for delivery of fluid from said first inlet to each of said first nozzles and second conduit means for delivery of fluid from said second inlet to each of said second nozzles.

6. A spray apparatus for use on a gas turbine, said apparatus comprising, in combination, an annular housing having an axial bore, spraying means carried by said housing, said spraying means comprising a plurality of nozzles recessed within said housing so as not to protrude into said axial bore, each said nozzle having an orifice adapted to spray fluid generally radially inward of and axially along said housing axial bore, with the interior surface of said housing having a groove adjacent each said nozzle adapted to allow passage of said axially directed spray of fluid, means for delivering fluid to said nozzles, and means for securing said housing through a gas turbine in a position for delivery of a fluid spray into said gas turbine.

7. The spray apparatus recited in claim 6 wherein said housing includes a plurality of apertures extending generally radially from said axial bore, each said nozzle located in one of said apertures with an inner terminal position whose radius from the axis of said axial bore is at least equal to the bore radius.

8. The spray apparatus recited in claim 7 wherein each said nozzle includes an enlarged portion outwardly of said housing means sized to prohibit passage of said nozzle through its respective aperture and into said axial bore.

* * * * *